No. 896,718. PATENTED AUG. 25, 1908.
S. B. FRIDAY.
BUTTER CUTTING MACHINE.
APPLICATION FILED APR. 15, 1907.
3 SHEETS—SHEET 1.
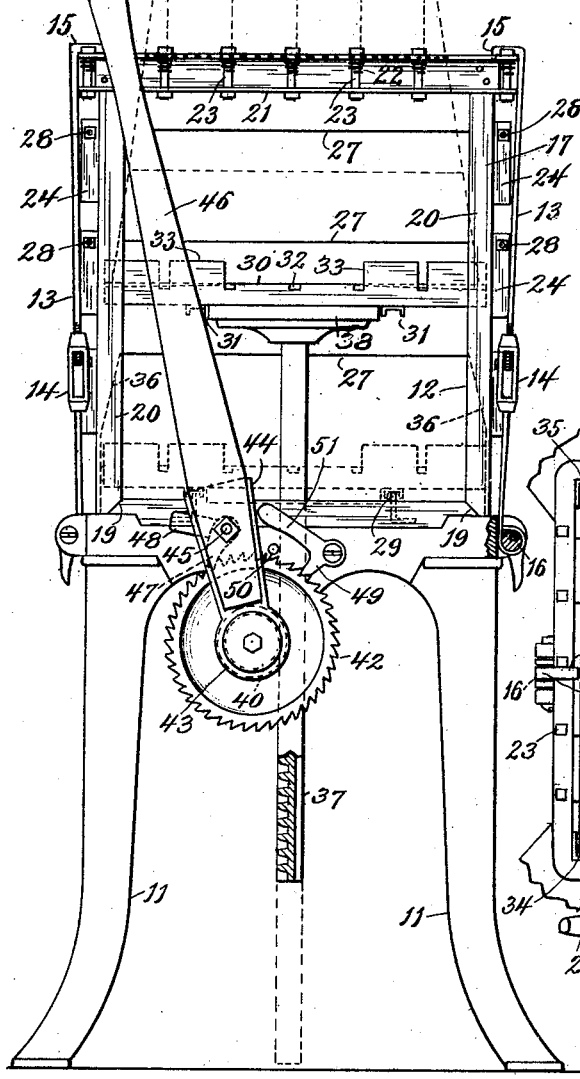
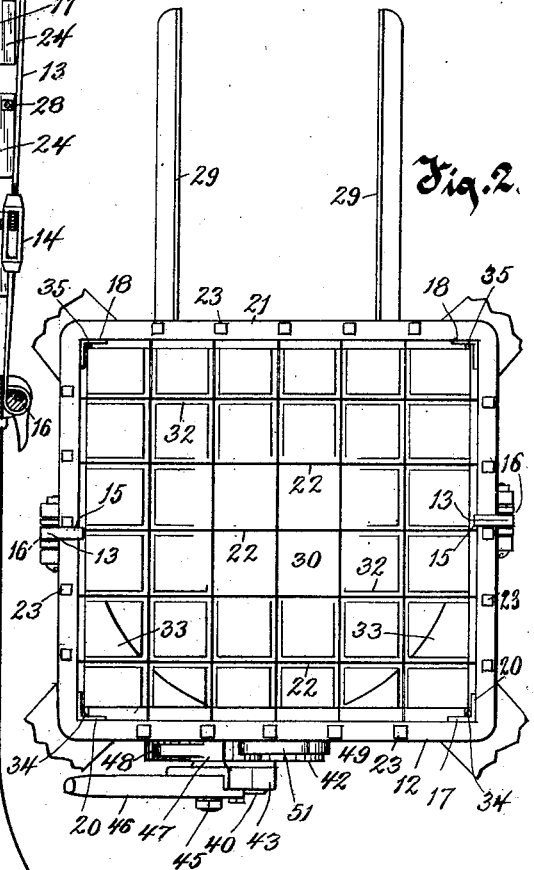

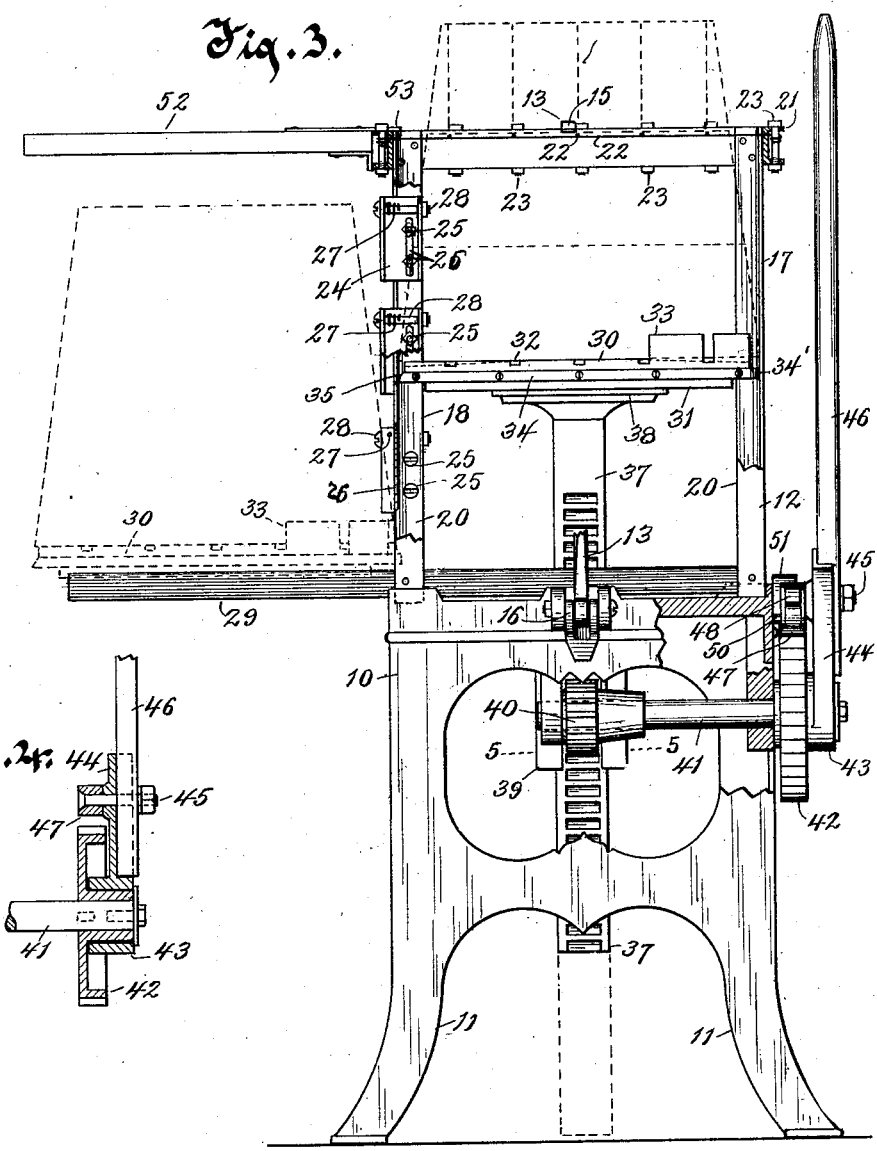

No. 896,718.  
PATENTED AUG. 25, 1908.
S. B. FRIDAY.  
BUTTER CUTTING MACHINE.  
APPLICATION FILED APR. 15, 1907.
3 SHEETS—SHEET 3.
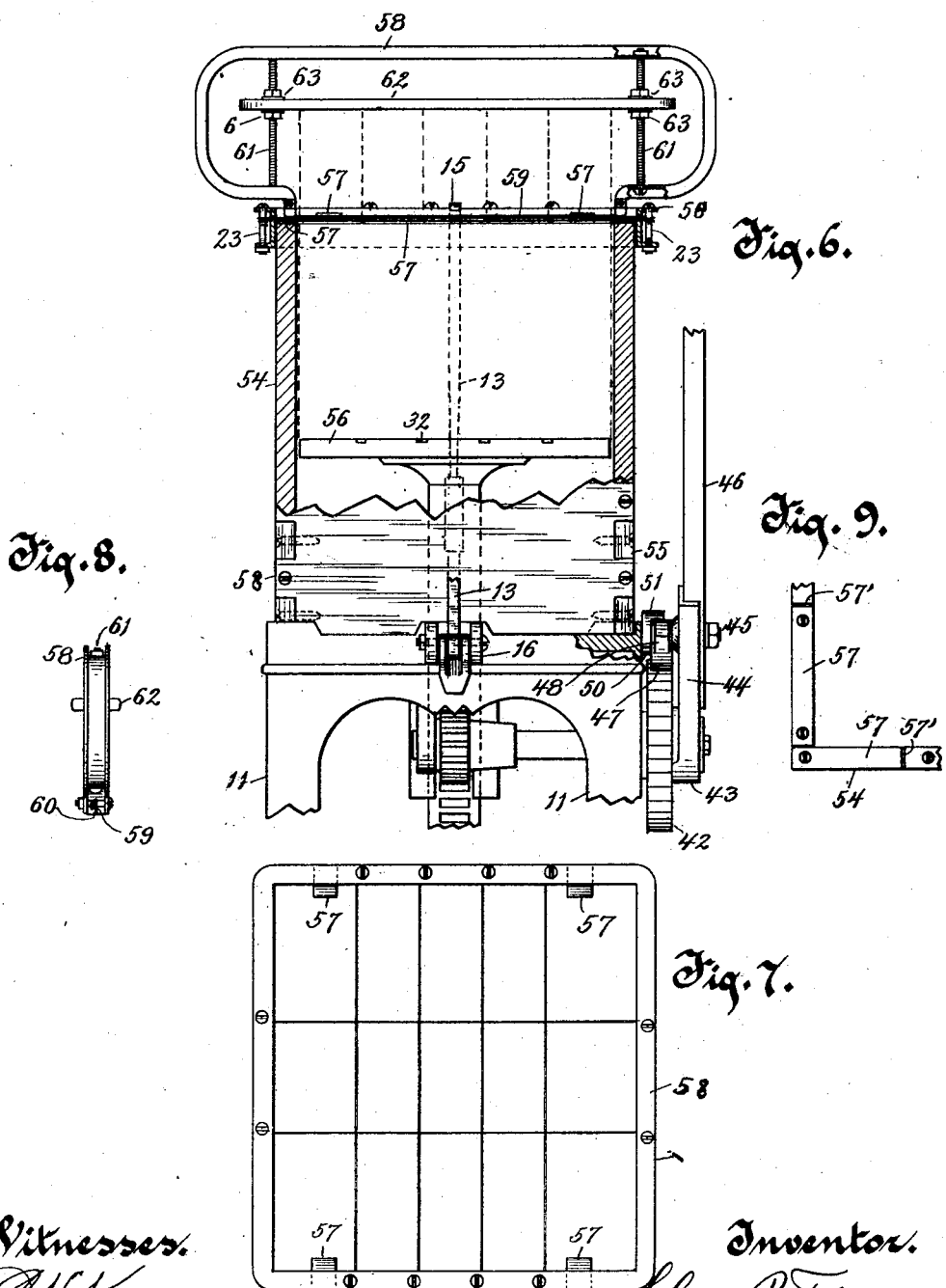

UNITED STATES PATENT OFFICE.

SOLOMON B. FRIDAY, OF BRANDON, WISCONSIN.

BUTTER-CUTTING MACHINE.

No. 896,718.     Specification of Letters Patent.     Patented Aug. 25, 1908.

Application filed April 15, 1907.   Serial No. 368,147.

*To all whom it may concern:*

Be it known that I, SOLOMON B. FRIDAY, residing in Brandon, in the county of Fond du Lac and State of Wisconsin, have invented new and useful Improvements in Butter-Cutting Machines, of which the following is a description, reference being had to the accompanying drawings, which are a part of this specification.

My invention has relation to improvements in butter cutting machines.

One of the objects contemplated is to provide a device for making molds of butter and similar substance of uniform size and weight from bulk or tub butter.

Another object is to provide means for making the horizontal cuts of the butter and to accomplish this result without the aid of a bow knife.

Another object contemplated is to provide a device which can be adjusted for making molds of varying sizes and weight.

A further object is to provide adjustable means for clamping the cutter portion of the device to the stand or support.

A still further object is to provide improved means for operating the butter lifting portion of the device.

A still further object is to provide improved means for increasing the tension on the crossed cutting wires.

With the above, and other incidental objects, in view the invention consists of the devices and parts or their equivalents, as hereinafter described.

In the accompanying drawings, Figure 1 is a front elevation of the machine, a part broken away to show the teeth of the rack bar; Fig. 2 is a plan view, parts broken away; Fig. 3 is a side view of Fig. 1, parts broken away; Fig. 4 is a sectional view of the toothed wheel and a fragment of the operating handle; Fig. 5 is a transverse section on line 5—5 of Fig. 3; Fig. 6 is a view similar to Fig. 3 but slightly modified and also showing the horizontal cutter in position for cutting; Fig. 7 is a plan view of the removable cutter frame shown in Fig .6 removed from the machine; Fig. 8 is an end view of the horizontal cutter; and Fig. 9 is a detail of one corner of the box.

Like numerals of reference refer to corresponding parts throughout the different views of the drawings.

The reference numeral 10 indicates the main supporting table or frame, which may be made of any suitable size or shape but is preferably made as shown with depending legs or supports 11, 11. Resting upon the top of this table is a rectangular frame 12 securely held to the table top by means of adjustable clamping rods 13, 13 provided with turn-buckles 14, 14 to adjust the length of the clamping rods. The upper ends of these clamping rods are bent hook-shape as indicated by 15, 15 and are adapted to hook over the top of the rectangular frame 12 and hold the same frame rigidly to the table top. The lower ends of the clamping rods are adapted to be connected to the main frame by means of eccentrics 16, 16 eccentrically pivoted to said frame and connected to said rods by means of eyes formed on the ends of the rods surrounding the eccentrics, so that when the handle of the eccentric is forced downwardly the clamping rods will clamp and securely hold the rectangular frame to the main frame.

The rectangular frame 12 consists of front and rear U-shaped members 17 and 18 formed of angle iron notched as at 19, 19 and the ends bent up at right angles forming uprights 20, 20 to which is rigidly connected by riveting a horizontally disposed rectangular wire-carrying frame 21 formed of channel iron with the flanges thereof extending outwardly horizontally. The rectangular wire-carrying frame 21 is provided with crossed cutting wires 22, 22 secured to the frame in such manner as to be readily tightened, and this is accomplished by passing the ends of the wires through small openings in the vertical portion of the channel iron and also through small holes in screw bolts 23, 23, extending through both flanges of the channel iron, the heads of the bolts resting on top of the upper flange and nuts threaded to the lower ends of the bolts turned against the under side of the lower flange. The wires are tightened by loosening the nuts and turning the bolts which will wrap or wind the wires thereon and draw them taut. The nuts are then tightened to lock the bolts in position and prevent their accidental loosening.

The outer sides of the rear uprights 20, 20 are provided with vertically adjustable channel members 24, 24, securely bolted to the uprights by means of bolts and nuts 25, 25 passing through slots 26, 26 in the adjustable channel members 24, 24 and then through holes in the uprights 20 as clearly shown in Fig. 3 of the drawings. The adjustable channel members 24, 24 are also provided with horizontal cutting wires 27, 27 for cutting the butter into horizontal cakes when the bulk butter is pushed into the machine into position to be cut vertically. The ends of the horizontal cutting wires 27, 27 are passed through small openings in the adjustable channel members 24, 24 and also through small holes in screw bolts 28, 28 extending through both flanges of the adjustable channel members 24, 24. These bolts are screw-threaded and provided with nuts and the wires are tightened and secured in the same manner as the wires connected to the rectangular frame 21. The channels 24, 24 may be adjusted vertically in relation to each other and thus vary the size and weight of the rectangular cakes of butter.

The lower horizontal front and rear portions of the U-shaped members 17 and 18 are connected together by angle pieces 29, 29 bolted thereto and these angle pieces extend a considerable distance rearwardly from the rear U-shaped member and also serve as a track for a movable plunger or platform 30 provided with guides 31, 31 upon its under side which rest upon the track and guides the platform or plunger into and out of the machine proper. The top of the plunger or platform is provided with short kerfs or grooves 32, 32 which register with the vertical cutting wires and are adapted to compensate for the bowed or arched form which the cutting wires assume under the pressure of passing through the butter, and thus entirely pass through and cut the butter to the bottom and thereby making the bottom cakes as clean cut and smooth as the ones above.

As considerable pressure is exerted in forcing the bulk butter, resting upon the platform, into the machine proper and thereby cutting the butter into horizontal cakes, I have provided the platform with blocks 33, 33 curved inwardly and conforming to the shape of tub butter, and these blocks act as stops to prevent the butter from being pushed off of the platform and also to position the bulk butter centrally on the platform. The kerfs or grooves in the top of the platform extend entirely through the blocks 33, 33 so that they will not prevent the cutting wires from passing to the bottom of butter resting upon the platform.

The side edges of the platform 30 are provided with metal strips 34, 34 attached thereto by screws, and these strips extend a slight distance forwardly and rearwardly of said platform. The forward extensions are beveled inwardly as indicated at 34, 34 and the rearward extensions are beveled downwardly as at 35, 35. The beveled ends 34, 34 prevent the corners of the platform from striking the uprights and act to guide the platform into the machine proper, and the beveled ends 35 35 position the platform centrally between the uprights 17, 17 if the said platform has not been pushed into the machine quite far enough, in which event the bevels coact with the angular cut portions 36, 36 of the flange of the rear uprights 17, 17 and move the platform in proper position when the said platform is moved upwardly. The plunger or platform 30 is moved vertically by means of a rack bar 37 provided with a head 38. The rack bar extends through an opening in the top of the frame and a suitable guide 39 integral with the frame. The teeth of this rack bar are engaged by a pinion 40 at the inner end of a short shaft 41, said shaft carrying on its outer end and rigidly connected thereto, a ratchet wheel 42 provided with ratchet teeth around its peripheral flange. The ratchet wheel 42 has a hub extending outwardly therefrom and loosely surrounding this hub is a circular bearing 43 forming part of a handle member 44 and to said handle member is bolted by means of a bolt 45 an operating handle 46. The handle member is prevented from working off of the ratchet wheel hub by means of a cap washer, of larger diameter than the opening in the handle member, bolted to the outer end of the short shaft 41. Pivoted to the inner face of the handle member 44 by means of the bolt 45 is a pawl 47 adapted to engage the teeth of the ratchet wheel 42. The pawl is provided with an arm 48 extending therefrom which serves to keep the pawl in engagement with the teeth of the ratchet wheel in all positions of the handle when the rack bar is being raised. Pivoted to the frame 10 is a stop pawl 49 adapted to engage the teeth of the ratchet wheel and hold it in any position to which it has been turned by the handle and thereby prevent the rack bar and platform from dropping after it has been raised.

In order to lower the platform and rack bar easily, I provide pawl disengaging means consisting of a pin 50 extending outwardly from the frame immediately above the ratchet wheel and directly in the path of movement of the lower portion of the pawl 47 and this pin is adapted to lift the said pawl from the ratchet wheel when the operating handle is moved to the right a slight distance beyond a vertical line drawn through the center of the ratchet wheel. This same movement of the operating handle will cause the upper portion of the pawl 47 to engage an arm 51 formed integral with the stop pawl 49 and will also lift this pawl from the ratchet wheel. The ratchet wheel is then free to be turned by the weight of the platform and rack bar and if no provision was made for retarding the movement of the ratchet wheel these parts would fall rapidly and noisily and tend to jar the machine and perhaps break some of the parts. To regulate the rapidity of rotation of the ratchet wheel and consequently the speed of dropping the connected parts, I have provided the circular bearing 43 loosely surrounding the hub of the ratchet wheel as before explained. The regulation being accomplished by pulling out or pushing in on the handle 46, either movement will cause the circular bearing 43 to bind against the hub of the ratchet wheel and retard its rotation, the retardation depending upon the pull or pressure exerted.

A shelf 52 provided with hooks 53 may be attached to the rectangular frame if desired and is conveniently adapted to hold the plurality of cakes of butter after being cut.

In the operation of the machine as thus far disclosed, the upper portion of the frame consisting of the rectangular wire-carrying part and the U-shaped members is securely clamped to the main supporting frame by means of the clamping rods. The platform is moved out on the track into position to receive thereon a mass of butter from a tub as indicated in Figs. 1 and 3, in dotted lines. The mass is then pushed into the machine causing the cutting wires 27 to cut the mass into horizontal cakes of a height corresponding to the distance the wires are spaced apart, and the lowest wire is spaced above the platform. The upper wire is adapted to cut the surplus butter from the mass in case the mass is somewhat higher than the usual mass from a tub, the said wire being spaced from the platform the exact height of the average cylinder of butter from a tub.

As soon as the mass of butter on the platform has been moved into the machine, the operating handle is then moved from a vertical position to the left back and forth. This will cause the pawl to successively engage and rotate the ratchet wheel, the short shaft and the pinion 40 thereby lifting the rack bar and the platform resting on the head formed on top of the rack bar. The mass of butter is thus brought into contact with the cutting wires carried by the rectangular frame and is thereby divided into a plurality of rectangular prints or cakes of predetermined size and weight. When tub butter is cut in this machine, there will necessarily be a number of odd and unequal shaped cakes cut on account of the cylindrical shape of the mass, and these odd shaped cakes can again be packed in a tub for recutting.

In Figs. 6, 7, 8 and 9, I have shown a modified form of cutter especially adapted for cutting bulk butter directly packed into the machine, and in order to accomplish this result I have provided an inclosed case 54 and a removable rectangular wire-carrying frame 58 disposed on top thereof and clamped thereto and to the main frame by means of clamping rods 13. A vertically movable platform 58 serves as the bottom of the case while packing the butter therein, and when the case is filled acts as a plunger to force the mass of butter against the cutting wires disposed above to divide it vertically. The platform or plunger 56 is raised and lowered by means of the rack bar in the same manner as before described. The rectangular frame 58 is provided with lugs 57, 57 extending inwardly therefrom and are adapted to rest upon the case 54 and support said frame. The crossed cutting wires are connected to the said frame in the same manner as before described. The casing 54 is formed of wood tongued and grooved at the corners as indicated at 55, and each tongue is provided with a screw which passes therethrough and screws into the wood forming the groove thereby forming a construction which is water tight at the corners and very strong. The top edge of the casing is provided with metal strips 57 to protect the wood from wear, and the strips have kerfs or grooves 57' formed therein coincident with the crossed cutting wires and are provided for the purpose of properly positioning the rectangular frame thereon which is necessarily made larger than the case to allow for the swelling of the wood due to moisture of the butter. The cutting wires accurately fit into the kerfs or grooves and thus correctly divide the contents of the case. In the construction just outlined it is necessary to provide independent means for making the horizontal cuts in the bulk butter and to accomplish this I have provided an improved device consisting of an arched or bowed frame 58 made preferably of channel iron with the flange disposed outwardly. The ends of this frame are turned inwardly a short distance and then downwardly at right angles to the inward bend.

A horizontal cutting wire 59 extends across from one downward bent end to the other, and is held under tension by means of adjusting bolts extending through both flanges, and the wire is attached thereto in the same manner as the cutting wires before explained. The downward bent ends are provided with notches 60 to accommodate the wire 59 and prevent its slipping sidewise. Extending from the upper part of the frame 58 to the inwardly bent portion thereof are threaded rods 61, 61. These rods are provided with heads at the end and nuts at the other end so as to be firmly held to the frame. These rods pass freely through holes in a gage bar 62. Engaging the threads of the rods above and below the gage are nuts 63, 63 which permit the vertical adjustment of the gage 62 to vary the height and weight of the cakes of butter.

In cutting bulk butter into cakes with this modified form of construction the platform is lowered to its lowest position within the case; the butter is then packed therein and the handle is moved back and forth as before explained, until the top of the mass of butter extends a slight distance above the top of the case. The horizontal cutter is then drawn over the top of the case above the vertical cutting wires to make a smooth clean surface for the top of the upper cakes. This cut mass is then removed. The handle is again moved back and forth until the mass of butter has been forced up by the vertical cutting knives, which will divide the mass into vertical squares, until the upper surface has reached the desired height, depending upon the position of adjustment of the gage 62, when the gage is again drawn over the top of the case cutting the butter into rectangular cakes of predetermined size and weight similar to the cakes cut in the machine as first explained. I do not wish to be understood as limiting the use of said mechanism for cutting butter as it is quite evident that any material of like consistency may be cut into cakes in the same manner as described.

What I claim as my invention is:

1. In a butter cutter, the combination of a main frame, another frame provided with means for cutting material horizontally and vertically resting upon said main frame, and means for moving a mass of material in a direction to receive both horizontal and vertical cuts during said movement.

2. In a butter cutter, the combination of a main frame, a rectangular frame provided with means for cutting material horizontally and vertically resting upon said frame, and means for moving a mass of material in a direction to receive both horizontal and vertical cuts during said movement.

3. In a butter cutter, the combination of a main frame, a rectangular frame provided with wires for making horizontal and vertical cuts resting upon said frame, and means for moving a mass of material in a direction to receive both horizontal and vertical cuts during said movement.

4. In a butter cutter, the combination of a main frame, a rectangular frame provided with wires for making horizontal and vertical cuts resting upon said frame, means provided to allow a mass of material to be forced against cutting wires to receive horizontal cuts, and other means for forcing the horizontally cut mass of material against cutting wires to receive vertical cuts.

5. In a butter cutter, the combination of a main frame, a rectangular frame resting upon said main frame, a platform adapted to be moved to a position immediately below the rectangular frame, means connected to said rectangular frame for cutting a mass of butter disposed upon said platform into horizontal layers when said platform is thus moved, means for moving the platform and its mass of horizontally cut layers of material vertically, and other means connected to the rectangular frame for cutting the horizontal layers of material vertically into a plurality of cakes when said platform is moved vertically.

6. In a butter cutter, the combination of a main frame, a rectangular frame provided with wires for making horizontal and vertical cuts resting upon said frame, means for adjusting the distance apart of the wires for making the horizontal cuts, and means provided whereby a mass of material is forced against the wires adapted for making horizontal cuts and cut into layers and is afterwards forced against the wires for making vertical cuts and cut into a plurality of cakes.

7. In a butter cutter, the combination of a main frame, a rectangular frame provided with wires adapted to make horizontal and vertical cuts resting upon said frame, adjustable means for clamping the rectangular frame to the main frame, adjustable means for spacing apart the wires adapted to make horizontal cuts, and means provided whereby a mass of material is forced against the wires adapted for making horizontal cuts and cut into layers and afterwards forced against the wires for making vertical cuts and cut into a plurality of cakes.

8. In a butter cutter, the combination of a main frame, a rectangular frame provided with wires adapted to make horizontal and vertical cuts resting upon said frame, adjustable means for clamping the rectangular frame to the main frame, adjustable means for spacing apart the wires adapted to make horizontal cuts, a platform adapted to be moved to a position immediately below the rectangular frame, a rack bar for raising said platform vertically, and means for moving said rack bar.

9. In a butter cutter, the combination of a main frame, a rectangular frame provided with wires adapted to make horizontal and vertical cuts resting upon said frame, adjustable means for clamping the rectangular frame to the main frame, adjustable means for spacing apart the wires adapted to make horizontal cuts, a platform adapted to be moved to a position immediately below the rectangular frame, a rack bar for raising said platform vertically, a pinion in mesh with said rack bar, a shaft connected to said pinion, a ratchet wheel mounted on said shaft, and means for rotating said ratchet wheel.

10. In a butter cutter, the combination of a main frame, a rectangular frame provided with wires adapted to make horizontal and vertical cuts resting upon said frame, adjustable means for clamping the rectangular frame to the main frame, adjustable means for spacing apart the wires adapted to make horizontal cuts, a platform adapted to be moved to a position immediately below the rectangular frame, a rack bar for raising said platform vertically, a pinion in mesh with said rack bar, a shaft connected to said pinion, a ratchet wheel mounted on said shaft, a pawl in operative engagement with said ratchet wheel, a hand lever for operating said pawl, a stop pawl for preventing the rotation of the ratchet wheel in one direction, and means for releasing said pawls from said ratchet wheel when the hand lever is swung to a certain position.

11. In a butter cutter, the combination of a main frame, a rectangular frame provided with wires adapted to make horizontal and vertical cuts resting upon said frame, adjustable means for clamping the rectangular frame to the main frame, adjustable means for spacing apart the wires adapted to make horizontal cuts, a platform adapted to be moved to a position immediately below the rectangular frame, a rack bar for raising said platform vertically, a pinion in mesh with said rack bar, a shaft connected to said pinion, a ratchet wheel mounted on said shaft, a pawl in operative engagement with said ratchet wheel, a hand lever for operating said pawl, a stop pawl for preventing the rotation of the ratchet wheel in one direction, said stop pawl provided with a lifting arm, and a pin extending from the main frame into the path of movement of the lower part of the pawl, and adapted to lift the said pawl out of engagement with the ratchet wheel, at the same time the stop pawl is also lifted from said wheel by the upper portion of said pawl lifting the arm of the stop pawl.

12. A frame for carrying cutting wires adapted for use in a butter cutter, comprising a rectangular frame having U-shaped portions depending therefrom, bars connecting the lower portions of the U-shaped members together, cutting wires disposed on the frame for making vertical cuts, cutting wires disposed on the U-shaped members for making horizontal cuts, adjustable means for connecting these last mentioned wires to the U-shaped member, and adjustable means for increasing the tension of the cutting wires.

13. In a butter cutter, the combination of a main frame, a rectangular frame provided with wires adapted to make horizontal and vertical cuts resting upon said frame, adjustable means for clamping the rectangular frame to the main frame, adjustable means for spacing apart the wires adapted to make horizontal cuts, a platform adapted to be moved to a position immediately below the rectangular frame, and a track for said platform to slide on, extending outwardly from the frame.

14. In a butter cutter, the combination of a main frame, another frame provided with means for cutting material vertically clamped to said main frame by adjustable clamping means, a platform adapted to move material against said cutting means, and means for moving said platform.

15. In a butter cutter, the combination of a main frame, a rectangular case resting upon said frame, another frame provided with means for cutting material resting upon said case, means provided on said case for positioning the cutting means thereon, a platform adapted to move material against said cutting means, and means for moving said platform.

16. In a butter cutter, the combination of a main frame, a rectangular case resting on said main frame, another frame provided with wires for cutting material resting upon said case, adjustable clamping means for clamping the rectangular case and the frame resting thereon to the main frame, kerfs or grooves provided on the top of said case adapted to receive the cutting wires therein to position the same in relation to the case, a platform adapted to move material against said cutting wires, and means for moving said platform.

17. A combined gage and butter cutter, consisting of an arched or bow-shaped member with a part near its ends turned inwardly and the ends bent downwardly, a cutting wire extending from one downwardly bent end to the other, threaded rods extending from the upper part of said frame to the inwardly bent portions thereof, a gage connected to said threaded rods, and means for holding said gage at an adjusted position on the rods.

18. A case for a butter cutter, consisting of a rectangular frame tongued and grooved at its corners, and screws extending through the tongue portion and into the portion forming the groove adjacent thereto.

19. A case for a butter cutter, consisting of a rectangular frame tongued and grooved at its corners, and screws extending through each tongue portion and into the portion forming the groove adjacent thereto.

20. In a butter cutter, the combination of a main frame, a frame mounted on said main frame and provided with wires for cutting butter horizontally, slidably adjustable members carried by the wire frame and to which members said wires are fastened, means mounted on said main frame for cutting the mass of material vertically, and means for moving the mass of material to a position to receive both the horizontal and vertical cuts.

In testimony whereof, I affix my signature, in presence of two witnesses.

SOLOMON B. FRIDAY.

Witnesses:
A. C. H. KEENEY,
ANNA F. SCHMIDTBAUER.